US005445774A

United States Patent [19]

Scribner

[11] Patent Number: 5,445,774

[45] Date of Patent: Aug. 29, 1995

[54] METHOD FOR DETECTING MOLD PLATE INFORMATION AND PLATE MOLD MATCHING SYSTEM

[75] Inventor: Cliff J. Scribner, Chandler, Ariz.

[73] Assignee: Motorola, Inc., Schaumburg, Ill.

[21] Appl. No.: 148,478

[22] Filed: Nov. 8, 1993

[51] Int. Cl.[6] ........................ B29C 45/80; B29C 33/30

[52] U.S. Cl. ................................ 264/40.5; 264/328.1; 425/138; 425/150; 425/171

[58] Field of Search ................. 264/40.5, 297.2, 328.1, 264/297.6, 297.7; 425/138, 150, 169, 171

[56] References Cited

U.S. PATENT DOCUMENTS 4,950,145 8/1990 Zanetos et al. .................. 264/297.7

FOREIGN PATENT DOCUMENTS 58-158229 9/1983 Japan .................................. 425/138

*Primary Examiner*—Jill L. Heitbrink

*Attorney, Agent, or Firm*—Aaron B. Bernstein

[57] ABSTRACT

A method for detecting mold plate information comprises, in a preferred embodiment, detecting external physical indicia (112) identify a mold plate. The external physical indicia (112) are preferably a pattern of holes or absence of holes formed in a corner protrusion (110), attached to the corner of a mold plate (104). The holes or absence thereof represent a binary sequence identifying the mold plate (104). Preferably, the holes are optically detected by detectors (204) mounted in the guide rail (202) of a mold press.

7 Claims, 3 Drawing Sheets

104

110

102

112

106

108

100

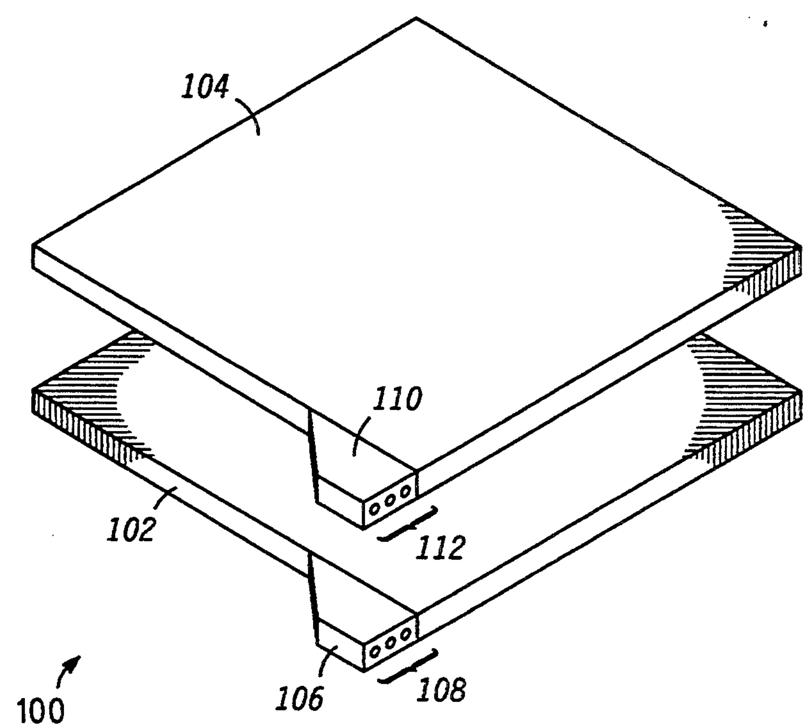
FIG. 1
FIG. 2
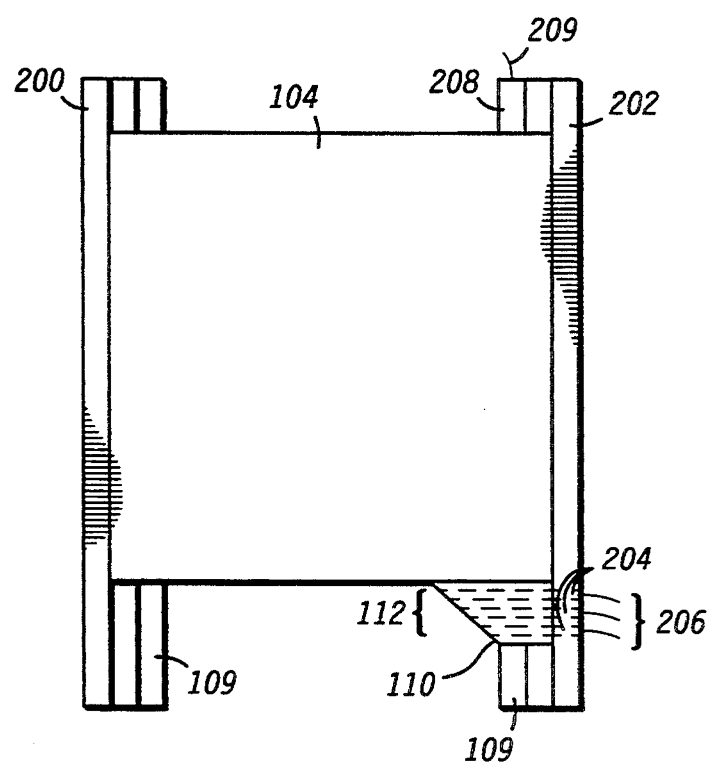

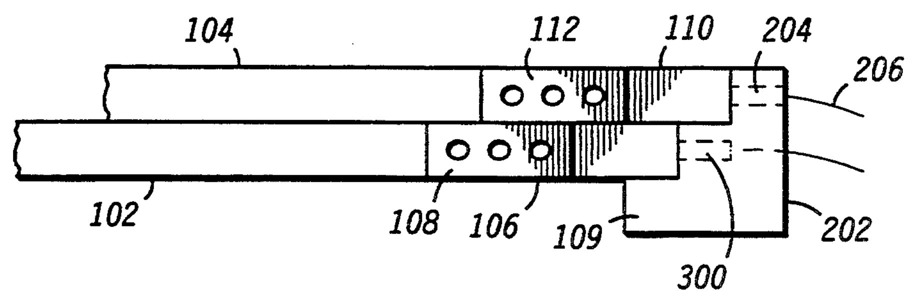
FIG. 3
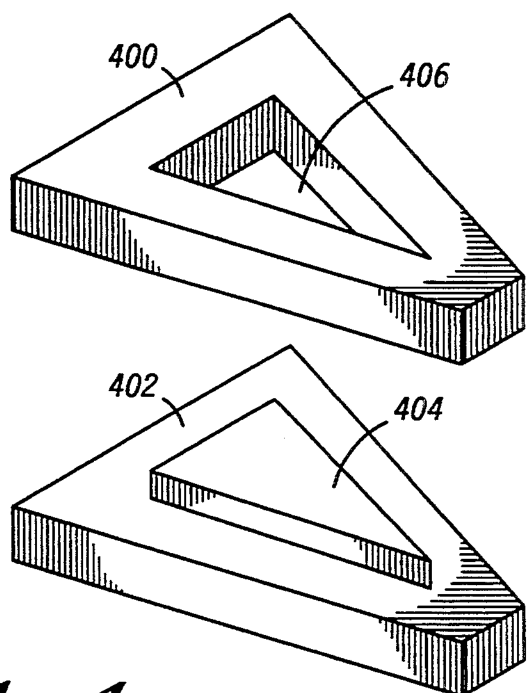
FIG. 4
FIG. 5
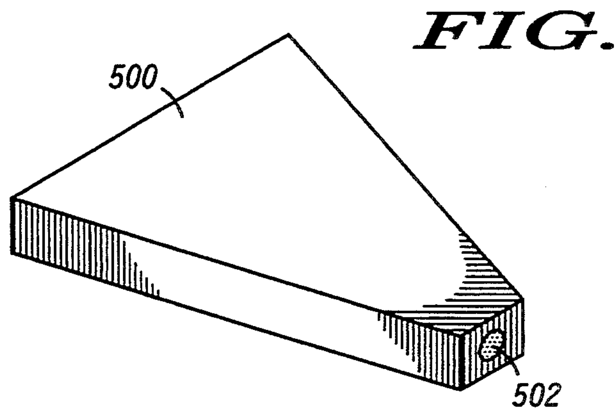

METHOD FOR DETECTING MOLD PLATE INFORMATION AND PLATE MOLD MATCHING SYSTEM

FIELD OF THE INVENTION

The present invention relates to mold plates, and more particularly, to matching mold plates of a plate mold pair.

BACKGROUND OF THE INVENTION

Plate mold systems comprise a top mold plate and a bottom mold plate. During the molding process, the top mold plate and the bottom mold plate are brought together. Subsequently, molding compound is injected into the mated plates.

In conventional plate mold manufacturing environments, a variety of plate mold pairs may be in use at any one time. A problem which arises in such an environment is the mismatch of mold plates. That is, the mold plate from a particular pair is incorrectly matched with a mold plate from a different pair. When such a mismatched pair is brought together by the mold press, the mold plates are usually destroyed because they have incompatible mold features.

Another problem which arises in conventional mold press environments is the misalignment of mold plates in the mold press. For example, a mold plate may not be inserted all the wall into the press along the press guide rails. Alternatively, the mold plate may be inserted backwards. If such conditions occur, the mold plates will be destroyed when the press is closed.

What is needed is a method for detecting mold plate identification information and a plate mold matching system which prevents the incorrect mismatch of mold plates, and prevents press closure if a plate is misaligned. It would be desirable if such a method and system was also capable of tracking use history information such as number of uses of a particular mold plate, etc. Such information could be used for statistical process control analysis, for example.

BRIEF DESCRIPTION OF THE DRAWINGS

FIG. 1 is a perspective view of a plate mold pair;

FIG. 2 is a top view of a mold plate supported by mold press guide rails;

FIG. 3 is a partial front view of a plate mold pair supported by a mold press guide rail;

FIG. 4 is a perspective view of a pair of corner protrusions used in association with a plate mold pair;

FIG. 5 is a perspective view of an alternate corner protrusion; and

DETAILED DESCRIPTION OF THE DRAWINGS

Figure 6:
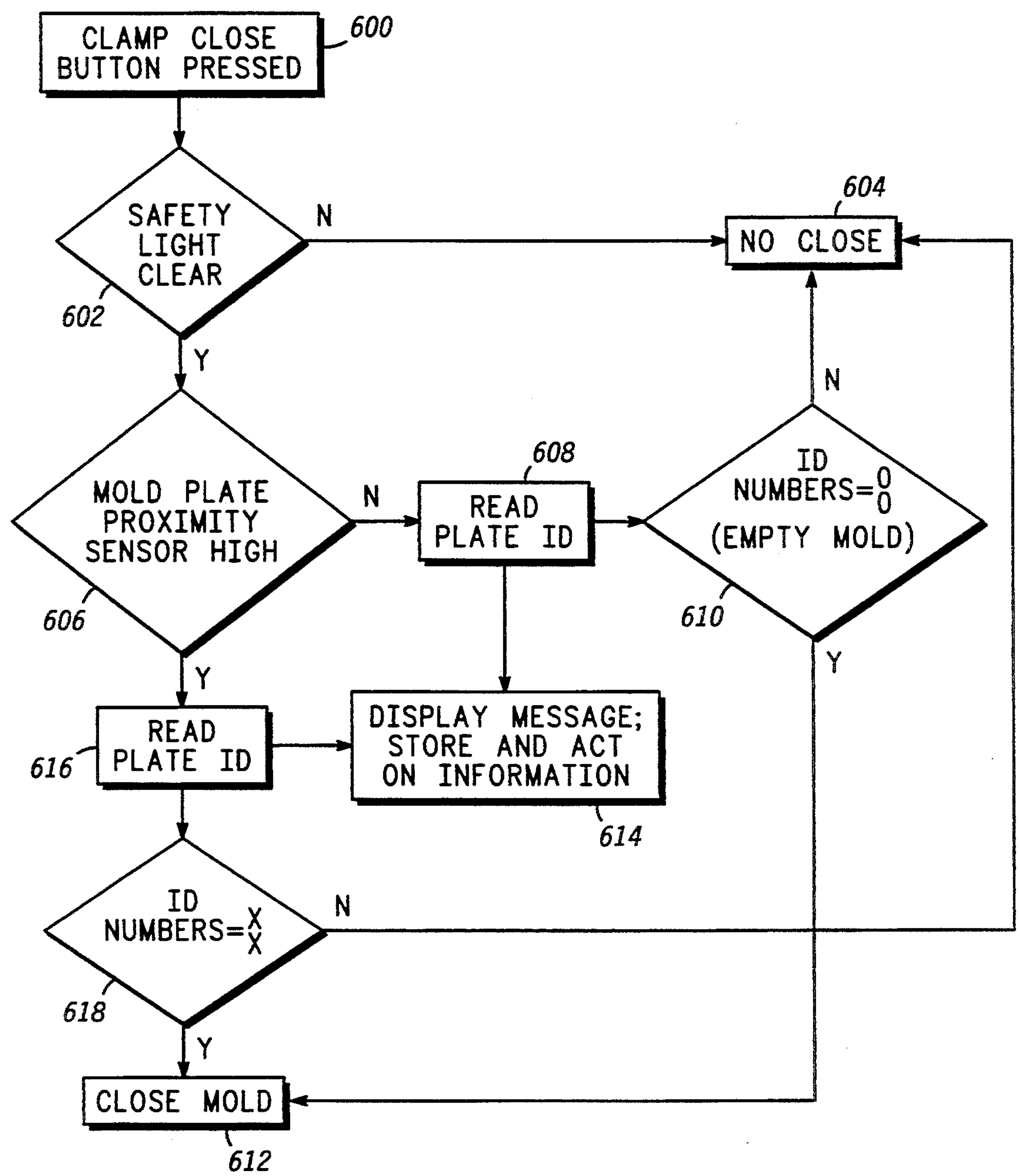
FIG. 6 is a flow diagram illustrating a method for detecting information relating to mold plates.

Generally stated, the present invention relates to a method for detecting information relating to mold plates, and a plate mold matching system. Broadly, an external physical indicia is added to a conventional mold plate. Two plates of a matching plate mold pair will typically have the same or related external physical indicia.

n a preferred embodiment, the external physical indicia comprises a corner protrusion attached to the conventional mold plate. In the preferred embodiment, the corner protrusion includes three locations where a hole may be present or absent. The presence or absence of holes are optically detected by optical detectors in the guide rails of the mold press.

A hole represents a binary zero, while the absence of a hole represents a binary one. Consequently, with each mold plate having three locations where a hole may be present or absent, the mold plate can thus be identified with a three digit binary number. In a preferred embodiment, two mold plates of a matching plate mold pair will be identified with the same binary number.

A more simplified embodiment consistent with the present invention also comprises corner protrusions attached to conventional mold plates of a plate mold pair. One of the corner protrusions of the plate mold pair has a protrusion with a specific geometric shape. The other corner protrusion of the plate mold pair has an opening matching the geometric shape. Prior to the plate mold pair being loaded in the mold press, the mold plates are manually brought together. They will only go together if the geometric shaped protrusion of the one plate fits the opening of the other mold plate.

Another simplified embodiment consistent with the present invention comprises corner protrusions which are color coded. Mold plates of a matching plate mold pair have the same color coded on their respective corner protrusions. A visual inspection identifies matching or mismatched plate mold pairs.

Turning to the figures for a more detailed understanding, FIG. 1 is a perspective view of plate mold pair 100. Plate mold pair 100 comprises first mold plate 102 and second mold plate 104. First mold plate 102 includes corner protrusion 106 attached to one corner of mold plate 102. Corner protrusion 106 includes external physical indicia 108. In the embodiment illustrated in FIG. 1, external physical indicia 108 comprise three locations where a hole may be present or absent. In the embodiment shown, if a hole is present it extends completely through corner protrusion 106.

Similarly, mold plate 104 comprises corner protrusion 110. Corner protrusion 110 is attached at one corner of mold plate 104. Corner protrusion 110 comprises external physical indicia 112. In the embodiment shown, external physical indicia 112 are three locations where a hole may be present or absent.

As will be discussed in more detail below, the holes or absence thereof, in corner protrusions 106 and 110, are optically detected by optical detectors in a guide rail of the mold press. The detection of a hole represents a binary zero. The detection of the absence of a hole represents a binary one.

In the preferred embodiment, the mold plates of a matching plate mold pair, 102 and 104, have the same sequence of holes or absence thereof. Consequently, each mold plate of a matching plate mold pair is identified by a three digit binary sequence unique to the pair. Note, as will be discussed in further detail below, in some instances mold plates may be considered compatible even though their identification information is not the same.

FIG. 2 is a top view of mold plate 104 resting on guide rails 200 and 202 of a mold press. For clarity, bottom plate 102 is not shown, although in operation plate 102 would rest on bottom rail portions 109. Guide rail 202 is adapted to house optical detectors 204 (shown with hidden lines) which are aligned to the hole locations 112 of corner protrusion 110. Wires 206 represent electrical leads which provide computer access to optical detectors 204.

Consequently, the binary sequence of mold plate 104 represented by the presence or absence of holes at locations 112 is optically/electrically detected and may be stored and processed by a computer as will be well understood by those skilled in the art.

Guide rail 202 further comprises a rear proximity sensor 208 which detects the position of mold plate 104. Wire 209 represents an electrical lead providing computer access to sensor 208. The rear portion of guide rail 202, where proximity sensor 208 is located, also serves as a mold plate locate stop which positions mold plate along the guide rail. Rail 200 has a similar stop.

Proximity sensor 208 may comprise an optical detector similar to detectors 204. It will be understood that a variety of other well known detection schemes may be possible, including, for example capacitive detection or physical/mechanical detection. It will be understood that optical detectors 204 may also alternatively comprise a variety of other detection schemes including, for example, capacitive detection, physical/mechanical detection, etc. It will be understood by those skilled in the art that the system disclosed could be easily adapted for any such scheme.

FIG. 3 is a partial side view of plate mold pair 100 mounted on guide rail 202. It will be understood that FIG. 3 represents the mold closed position of the plate mold pair (they have been brought together). FIG. 3 illustrates optical detector 204 aligned with the nearest position of positions 112 on corner protrusion 110. Additionally, FIG. 3 illustrates optical detector 300 aligned with the nearest position of positions 108 of corner protrusion 106.

FIGS. 2 and 3 represent a guide rail system of a mold press wherein the mold plates of the plate mold pair (102, 104) are offset from one another in a horizontal direction. That is, corner protrusion 110 does not lie directly above corner protrusion 106. It will be understood by those skilled in the art that other arrangements are possible, for example wherein the plates are directly aligned above and below one another.

FIG. 4 illustrates a simplified version of a method for detecting mold plate identification information and plate mold matching. The embodiment discussed thus far optically detects a three bit binary sequence identifying each mold plate. Mold plates with the same sequence are considered matching one another. FIG. 4 illustrates corner protrusions 400 and 402 which might replace corner protrusions 110 and 108 of the previous embodiment.

According to the embodiment illustrated by FIG. 4, a selected geometric shape is used to identify a particular plate mold pair. The geometric shape illustrated in FIG. 4 is an elongated triangle. More specifically, corner protrusion 402 includes a geometric shaped protrusion 404, having the shape of an elongated triangle. Correspondingly, corner protrusion 400 includes opening 406 with the same geometric shape. Thus, corner protrusion 400 is adapted to accept geometric shaped protrusion 404. The geometric shaped protrusion 404 and corresponding opening 406 are considered external physical indicia unique to the plate mold pair associated with the corner protrusions shown.

During the manufacturing process, the mold plates with corner protrusions 400 and 402 are manually brought together before loading into a mold press. If the geometric shapes of the corner protrusions do not fit together, a mold plate mismatch would is indicated and it is recognized that the two mold plates should not be used together.

FIG. 5 illustrates another simple system for identifying a matching plate mold pair. FIG. 5 illustrates alternative embodiment corner protrusion 500. Corner protrusion 500 includes an external physical indicia 502 which is a color coded marking. The corresponding corner protrusion of the matching mold plate of a plate mold pair includes an identical color coded marking. The particular color is unique to the specific plate mold pair. Visual inspection indicates whether the mold plates match.

Note that although attached corner protrusions have provided the mold plate identifying information in each of the embodiments discussed, it will be understood by those skilled in the art that other modifications to the mold plates may be used to provide the identifying information. For example, although not illustrated in the figures, a plate frame commonly used in association with mold plates, bordering the top surface of a mold plate and providing handles, may be adapted to provide identifying information. More specifically, such a plate frame may have holes drilled in it similar to the holes of corner protrusions 106 and 110. If such a system were employed, the optical detectors mounted in the guide rails of the mold press would be located so as to be aligned with the plate frame.

FIG. 6 is a flow chart illustrating one mode of operation for the methods and systems discussed. The steps illustrated by FIG. 6 apply to both the upper and lower mold plates. However, for clarity only one plate will be discussed. One skilled in the art will naturally recognize how the steps are applied to both plates.

The method is initiated with the clamp close buttons being pressed at box 600. It will be understood by those skilled in the art that the mold press, including associated sensors, is electrically coupled to a controlling computer, microprocessor or the like.

Once the clamp close buttons are pressed, the system (computer) determines whether the safety light is clear at box 602. The safety light indicates whether there is an obstruction in the path of the mold press moving parts. If the safety light is not clear the system proceeds to box 604 and the mold press is not closed.

If the safety light is clear the system proceeds to box 606. Referring back to FIG. 2 for illustration, rear proximity sensor 208 indicates whether a mold plate has been positioned and pushed all the way back on the guide rails of the mold press. Proximity sensor 208 will yield a "high" if a mold plate is detected. Two conditions are possible if a mold plate is detected, 1) the mold plate has been properly inserted, or 2) the mold plate has been inserted backwards. The manner in which the system distinguishes the two possible conditions is discussed below.

Returning to FIG. 6, if no mold plate is detected (proximity sensor indicates "low" ) two conditions are possible. Either there is no mold plate on the rail or the mold plate has not been properly positioned all the way back on the rails. The system should allow the press to close if no plate is on the rails. However, the press should not close if a plate is on the rail but not properly positioned.

To determine which condition exists, the plate identification is read by sensors 204 (FIG. 2) at box 608. Since holes represent logical "low", or "0", the sensors will read all low if no plate is present. On the other hand, the sensors will detect all "high" if the plate is not properly positioned because all of the sensors will be blocked. (Note that the sequences "0, 0, 0" and "1, 1, 1" must therefore not be assigned to a plate mold pair). At box 610, if all zeroes are detected, then an empty guide rail is indicated. The system may then proceed to box 612 where the mold press is closed.

Note that at box 608, when the mold plate identification information is read, a message may be displayed at box 614. The message may be useful to the operator and may indicate, for example, the name of a mold plate, an empty condition, a "not fully inserted" condition, etc. Additionally, at box 608 the information detected may be stored and processed as desired.

Returning to box 606, if the mold plate proximity sensor 208 is high, thus indicating a mold plate being fully inserted, then the system proceeds to box 616 where the identification information is read. Similar to the step at box 608, 616 leads to box 614 where the information which is read may be stored and processed. Additionally, messages may be displayed depending upon the information obtained.

At box 618, the system determines whether the identification information indicates that the press should be closed. If all highs are detected for either plate, then that mold plate has been inserted backwards and the rear portion of the plate is blocking all of the sensors (the sequence "1, 1, 1" has been reserved for such error conditions). The system then proceeds to box 604 and the press is not closed. If the identification information for each plate is the same (represented in FIG. 6 by a reading of "X" for both plates), the system proceeds to box 612 where the mold press is closed. Normally, if the identification information does not match at box 618, then the system proceeds to box 604, and the mold press is not closed.

Note that the computer controlling the system may be programmed to permit mold press closure for certain mold plates which do not have identical binary sequences indicated by the holes in their corner protrusions. This may be desirable if certain mold plates are nonetheless compatible. Additionally, the use history (number of molding cycles, etc.) of mold plates can be tracked with the mold plate identification system described, thus providing convenient tracking for maintenance and statistical process control analysis, etc.

By now it should be appreciated that a method for detecting mold plate information and a mold plate matching system has been provided which prevents the incorrect mismatch of mold plates. Additionally, the method is capable of tracking use history information such as number of uses of a particular mold plate, etc. Such information can be used for statistical process control analysis, for example.

I claim:

1. A method for matching mold plates comprising the steps of: positioning a first mold plate in a mold press; electrically detecting first information relating to the first mold plate;

positioning a second mold plate in the mold press: electrically detecting second information relating to the second mold plate;

determining, in response to the first information and the second information, whether the first mold plate and the second mold plate are properly matching mold plates: and closing the mold press in response to determining that the first mold plate and the second mold plate are properly matching mold plates, 2. The method of claim 1, wherein the first information and the second information comprise mold plate orientation information.

3. The method of claim 1, wherein the step of electrically detecting comprises optically detecting.

4. The method of claim 3, wherein the first mold plate and the second mold plate comprise respective corner protrusions including optically detectable indicia.

5. The method of claim 1, further comprising the step of storing the first information and the second information.

6. The method of claim 5, wherein the first information and the second information comprise information indicating the use history of the first mold plate and the second mold plate, respectively.

7. The method of claim 1, wherein the mold press comprises a guide rail supporting the first mold plate, and the guide rail comprises a travel stop at a first end of the guide rail, the travel stop housing a proximity sensor, wherein the step of electrically detecting first information comprises detecting the position of the first mold plate with the proximity sensor.

* * * * *